Figure 1:
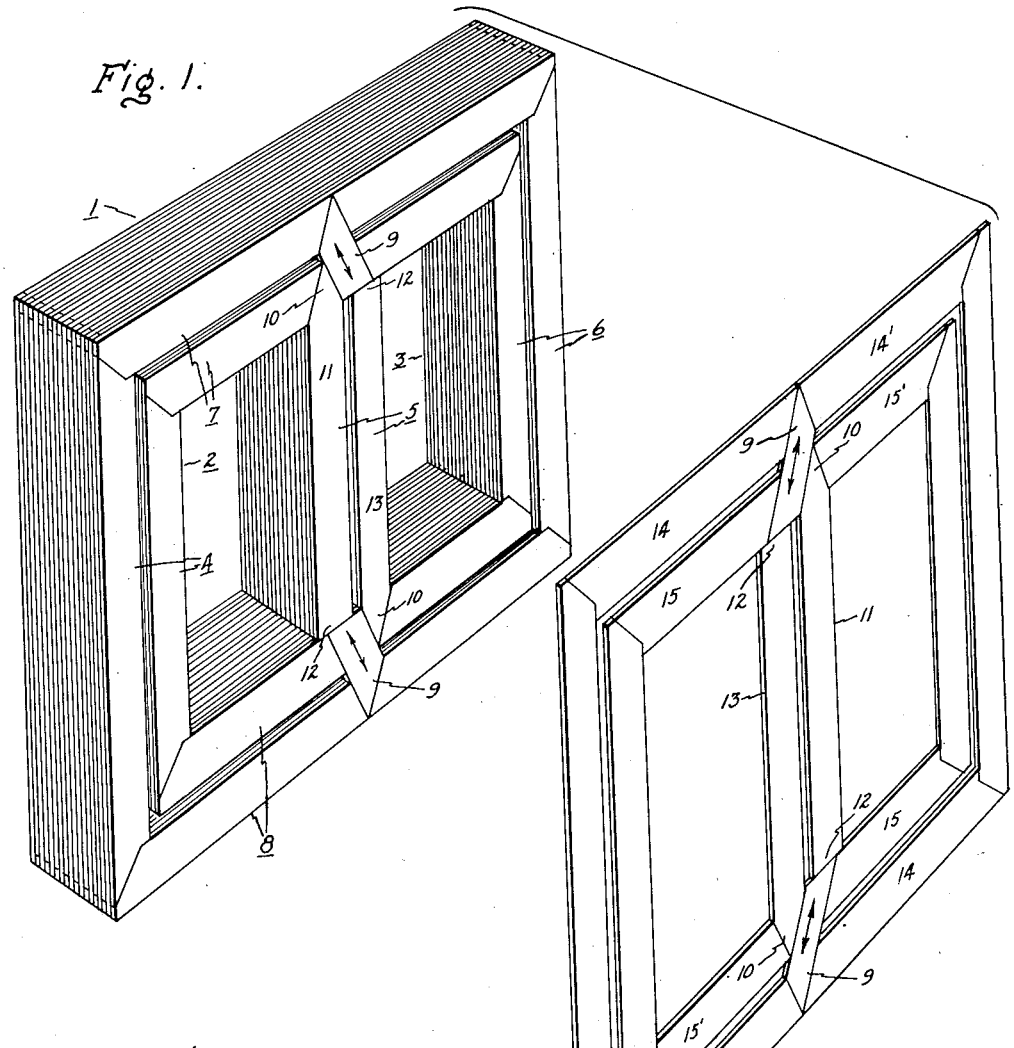

May 14, 1957     D. C. GRAHAM     2,792,554

THREE-PHASE MAGNETIC CORE

Filed Aug. 27, 1954

Inventor
Donald C. Graham,
by Gilbert P. Tarleton
His Attorney.

United States Patent Office 2,792,554
Patented May 14, 1957

2,792,554

THREE-PHASE MAGNETIC CORE

Donald C. Graham, Pittsfield, Mass., assignor to General Electric Company, a corporation of New York Application August 27, 1954, Serial No. 452,490

5 Claims. (Cl. 336—5)

This invention relates to magnetic cores for stationary induction apparatus and more particularly to an improved T joint between the center leg and yoke portions of a three-phase three legged double core of the stacked flat lamination or plate type.

Stacked flat lamination or plate cores differ from curved cores in that the various parts of each lamination layer all lie in the same plane. In three legged cores of this type, the legs in addition to being parallel are all in the same plane. In single phase three legged cores, the center leg is the only true leg in the sense of being a winding leg and it has twice the width of the outer legs which in effect are parts of a divided yoke. In three-phase three legged cores, the legs are all winding legs and all have the same width. In effect, each pair of legs act as return paths for the flux of each remaining leg. This means that the flux interchange at the T joint between the center leg and the yokes is continually changing. For example, at instants when the flux in the center leg is zero, all of the flux goes through the yoke portion only of the T joint. At instants when the flux in the center leg is a maximum, this flux divides equally in opposite directions in the yoke portions of the T joint. At instants when the flux in either one of the outer legs is zero, the flux in the T joint is all between one yoke side only and the center leg. At instants when the flux in either one of the outer legs is a maximum, part of the yoke flux passes through the T joint without entering the center leg and the other part of the yoke flux is diverted through the center leg.

As most core laminations are today made of silicon steel alloys having a pronounced grain orientation or most favorable magnetic direction, it will be apparent that the changing division and direction of flux in the T joint make it difficult to obtain efficient utilization of the properties of such material in the T joint.

This problem is still more acute in double cores which are characterized by having a longitudinal duct in the legs and yokes. In other words, the legs and yokes are divided or split. For best magnetic operation of the core, the flux must be able to pass easily between each part of the center leg and each part of the yoke at the T joint. The principal reason for splitting oriented steel legs and yokes to form a double core is to reduce the effective corner area when the flux tends to go in a cross grain direction. If there is a single center duct or split it can be shown that this produces a fifty percent reduction in such area and hence a fifty percent reduction in corner losses due to cross grain flux travel. Secondary advantages of the duct are that it promotes cooling of the core and handling of its parts during their assembly.

Further to complicate the T joint problem, it is desirable to avoid having the individual butt joints between the parts in each lamination layer at the T joint in alignment in each successive or adjacent layer. That is to say, the individual joints in adjacent T joints should be overlapped and not form a butt joint in the core itself. Such overlapping not only produces a lower reluctance joint but it also gives greater mechanical strength and structural integrity to the core.

In order to reduce the yoke height, large three-phase plate cores are sometimes made with five legs, the three intermediate legs corresponding to the usual three winding legs and the two outer legs actually being part of auxiliary yokes for the flux of the two winding legs on each side of the center leg. The T joint between the center leg and the yoke of such so-called five leg cores presents essentially the same problem as in three legged cores, and therefore by the term three legged core, I mean a three winding leg core whether or not it has additional yoke legs.

An object of the invention is to provide a new and improved T joint for three (winding) leg three-phase plate cores.

Another object of the invention is to provide a new and improved three-phase magnetic core.

A further object of the invention is to provide a three-phase plate core having a more nearly balanced magnetic circuit and reduced excitation of parts in the region of the T joint between the center leg and yokes.

The invention will be better understood from the following description taken in connection with the accompanying drawing, and its scope will be pointed out in the appended claims.

Figure 2:
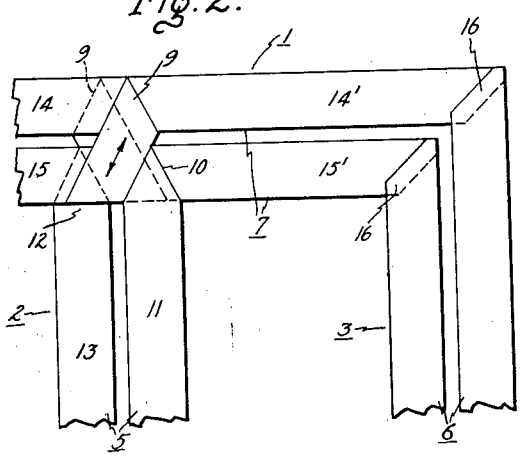

In the drawing, Fig. 1 is an exploded perspective view of a preferred embodiment of the invention, and Fig. 2 is a partial plan view in which the individual butt joints between the parts in successive lamination layers are indicated by solid and dashed lines respectively, so as more clearly to illustrate the overlapping of those individual butt joints.

Referring now to the drawing, the core may be described as consisting of a large laminated rectangle 1 in which are nested two smaller, but equal size, side by side related laminated rectangles 2 and 3. In Fig. 1, one of the outermost lamination layers has been moved away from the main body of the core so as more clearly to illustrate the reversal of parts in the successive layers for producing the desired overlapping of the individual butt joints.

The illustrated core may also be described as consisting of three parallel double legs 4, 5, and 6 and two parallel double yokes 7 and 8 which are at right angles to the legs and respectively join the corresponding ends thereof. The space between the yoke and leg parts is occupied by a duct. In normal operation, each of the three winding legs 4, 5, and 6 is provided with one or more windings which may be of conventional construction and which have not been illustrated.

The T joints between the center leg 5 and the yokes 7 and 8 in each lamination layer are characterized by the use of a trapezoidally shaped magnetic insert member 9 which makes butt contact with the two parts of the center leg and the two parts of each cooperating yoke portions. Preferably the shape of the insert 9 is substantially that of an isosceles trapezoid.

All of the parts of each lamination layer of the core are made of magnetic strip material having a grain orientation or most favorable magnetic direction which coincides with their lengthwise dimension. Typically, both parts of each leg and each yoke in each lamination layer are made of such magnetic strip material having the same width and the magnetic inserts 9 are also made of the same material in which case the altitude of the trapezoidally shaped inserts 9 is equal to 86% of the width of the other four parts. The most favorable magnetic direction of the inserts 9 is parallel to their parallel sides as indicated by the double ended arrows in the drawing.

Referring to the separated front lamination layer in Fig. 1, the T joint between the center leg 5 and the yoke 7 is characterized by having a pointed end 10 on one center leg part 11 and having a square end 12 on the other center leg part 13. The pointed end 10 is preferably symmetrical that is to say, it forms an isosceles triangle at the end of the part 11. The two parts 14 and 15 of the yoke 7 at the T joint are all bias cut along the same straight line or plane, and the end of the yoke part 14' is bias cut along a generally equal and opposite angle at the end adjacent the T joint. Likewise the end of the yoke part 15' is bias cut so as to make a quasi mitered or biased joint with one side of the pointed end 10 of the leg part 11.

The trapezoidal insert is so fitted into the T joint that its shorter parallel side makes butt contact with the side of the pointed end 10 of the center leg part 11 which is nearest the center of the core and the opposite or longer parallel side of the trapezoidal insert 9 makes butt contact with the ends of the yoke parts 14 and 15 at the T joint. One end of the insert 9 makes butt contact with the square cut end 12 of the part 13 of the center leg and the opposite end of the insert 9 makes a quasi mitered or biased butt joint with the end of the yoke part 14'.

The T joint between the center leg 5 and the bottom yoke 8 is the reverse of the top T joint. Thus the center leg parts 11 and 13 may actually be identical in that each has one pointed end and one square cut end.

As shown more clearly in Fig. 2 and by comparison of the separated lamination layer with the front lamination layer on the stack of laminations in Fig. 1, the T joints in successive layers are reversed so as to provide the overlap of the individual butt joints as indicated by the solid and dashed lines in Fig. 2. This also has the further advantage that the magnetic orientation of the insert 9 in successive layers makes reversed angles with respect to the center leg and yoke parts so that under certain instantaneous flux conditions the flux will favor the even numbered inserts, and under other instantaneous conditions, the flux will favor odd numbered inserts with the result that the average flux density remains substantially the same in different parts of the T joint throughout the entire cycle of flux changes.

The reversal or overlapping of the joints in successive layers is easily accomplished by turning successive lamination layers around.

The joints at the outer corners of each of the three rectangles 1, 2 and 3 may be of any suitable type such as overlapped mitered joints. The areas of overlap are clearly indicated at 16 in Fig. 2. However, it will be noted that with such construction of the outer corner joints, the lamination layers are not identical, and that one set of lamination layers has relatively long outer leg parts and relatively short upper and lower yoke parts whereas the intermediate set of lamination layers has relatively short outer leg parts and relatively long upper and lower yoke parts.

Among the reasons why the T joint construction of the present invention gives a more nearly balanced magnetic circuit and reduced over excitation in parts of the core within the T joint region is the fact that the T joint of the core as a whole closely approaches the shape of an equilateral triangle with its base at the end of the center leg and its apex at the outer edge of the yoke. This is best seen in Fig. 2 which shows how the superposed oppositely inclined inserts 9 have jointly a wide base at the end of the center leg and a relatively narrow apex at the outer edge of the yoke. Furthermore, as the altitude of this triangle is equal to its base (because the core legs and yokes have equal width), the minimum distance from either base corner of the triangle to its opposite side (i. e., a perpendicular from said opposite side passing through said corner) is at least 86% of its base and altitude. This results in the flux density in this triangle never exceeding the maximum flux density in the main body of the core when the flux in one outer leg is zero. Under this condition, the flux in the two remaining legs is 86% of maximum and this flux must pass through the T joint. Examination of each layer shows that this is also true in each layer.

This triangle shape also results in a graduated reluctance T joint, so far as yoke flux is concerned, when the center leg flux is zero. In other words, the yoke flux in the inner and shorter and otherwise lower reluctance part of the double core goes through the higher reluctance base part of the composite T joint triangle whereas the yoke flux in the outer, longer and otherwise higher reluctance part of the double core goes through the narrow apex part of this composite triangle. Hence there is a balancing or equalizing effect produced.

While there has been shown a particular embodiment of the invention, it will be obvious to those skilled in the art that changes can be made without departing from the invention, and therefore it is aimed in the appended claims to cover all such changes and modifications as fall within the true scope of the invention.

What I claim as new and desire to secure by Letters Patent of the United States is:

1. In a laminated three-phase magnetic core each lamination layer of which comprises three parallel double winding legs and two parallel double yokes at right angles to the legs and respectively joining the corresponding ends of the legs, the two parts of each double leg and the parts of each double yoke comprising equal width lengths of magnetic strip material having a lengthwise most favorable magnetic direction, a T joint between each end of the center leg and the center of each yoke comprising a symmetrically pointed end on one leg part and a square cut end on the other leg part, the end of the yoke part contiguous with the square cut end of said other leg part being bias cut parallel to the adjacent side of the point at the end of said one leg part, and a trapezoidal insert of magnetic strip material joining the center leg and yoke parts at said T joint, said trapezoidal insert having an altitude equal to 86% of the width of said leg and yoke parts and having a most favorable magnetic direction parallel with its parallel sides, one corner of said insert formed by its long side and an end making bias cut butt joints with one yoke part, the short parallel side of said insert making a butt joint with a side of the pointed end of said one leg part, the other end of said insert making a butt joint with the square cut end of said other leg part, and the end of the long parallel side of said insert adjacent its said other end making butt contact with said bias cut yoke part end.

2. A core as defined in claim 1 in which the relative position of the pointed end and square end center leg parts are reversed in successive lamination layers.

3. A T joint between the center leg and yoke portions in a lamination layer of a three winding legged three-phase double core of the plate type comprising in combination two parallel center leg parts, two parallel sets of two yoke parts extending in opposite directions from and perpendicular to an end of said center leg parts, and a trapezoidal magnetic insert for joining said center leg and yoke parts, said parts and said insert all being made of magnetic strip material having the same width and thickness and with a most favorable magnetic direction parallel with its lengthwise dimension, the width of said parts corresponding to the width of said strip, the altitude of said trapezoidal insert corresponding to 86% of the width of said strip, one center leg part at said end being symmetrically pointed and making with one side of the point a quasi-mitered joint with a yoke part and with the other side of the point a butt joint with the short side of said trapezoidal insert, the other center leg part at said end being square and making a butt joint with an end of said trapezoidal insert, the long side of said trapezoidal insert making butt joints with the ends of one set of yoke parts which ends are bias cut along the same straight line, the other end of said trapezoidal insert making a quasi-mitered joint with an end of the remaining yoke part.

4. A laminated magnetic core having a T joint composed of superimposed layer T joints each as defined in claim 3, the relative positioning of the pointed and square ended center leg parts being reversed in successive layers.

5. A T-joint between the center leg and yoke portions in a lamination layer of a three winding legged three phase magnetic core comprising two parallel spaced apart center core leg members forming a T-joint with two pairs of innermost and outermost parallel spaced apart yoke members extending in opposite directions from said T-joint, and a trapezoidal magnetic insert for joining said members, said members having the same widths and thickness and having a most favorable magnetic direction parallel to their lengthwise dimensions the altitude of said insert being 86% of the width of said members, the ends of one of said innermost yoke members and its respective one outermost member being bias cut and making a butt joint with the longest parallel side of said insert, the end of the other said outermost yoke members being bias cut and making a butt joint with one end of said insert, the end of one of said center leg members being square cut and making a butt joint with the other end of said insert and the innermost side of said one innermost yoke member, the end of the other said center leg member being symmetrically pointed with one side of said point making a butt joint with the other said inner yoke member and the other side of said point making a butt joint with the shortest parallel side of said insert.

References Cited in the file of this patent

UNITED STATES PATENTS

| | | |
|---|---|---|
| 2,456,461 | Dunn | Dec. 14, 1948 |
| 2,467,823 | Gordy | Apr. 19, 1949 |
| 2,698,924 | Gordy | Jan. 4, 1955 |